US005493320A

United States Patent [19]

Sandbach, Jr. et al.

[11] Patent Number: 5,493,320

[45] Date of Patent: Feb. 20, 1996

[54] INK JET PRINTING NOZZLE ARRAY BONDED TO A POLYMER INK BARRIER LAYER

[75] Inventors: David L. Sandbach, Jr., Longmont, Colo.; Lawrence R. Steward, Lexington, Ky.; Charles S. Whitman, Lexington, Ky.; Gary R. Williams, Lexington, Ky.; John D. Zbrozek, Lexington, Ky.

[73] Assignee: Lexmark International, Inc., Greenwich, Conn.

[21] Appl. No.: 312,349

[22] Filed: Sep. 26, 1994

[51] Int. Cl.[6] .......... G01D 15/18

[52] U.S. Cl. .......... 347/47; 347/63; 428/626

[58] Field of Search .......... 347/47, 63, 64, 347/65, 71; 428/626

[56] References Cited

U.S. PATENT DOCUMENTS

| | | | |
|---|---|---|---|
| 3,725,719 | 4/1973 | Seldon et al. | 313/317 |
| 4,389,654 | 6/1983 | Bar-on et al. | 347/45 |
| 4,608,268 | 8/1986 | Shimkunas | 427/8 |
| 4,668,336 | 5/1987 | Shimkunas | 156/643 |
| 4,809,428 | 3/1989 | Aden et al. | 347/63 |
| 5,229,785 | 7/1993 | Leban | 347/47 |

FOREIGN PATENT DOCUMENTS

| | | | |
|---|---|---|---|
| 57-03206 | 2/1982 | Japan | 347/64 |

*Primary Examiner*—Benjamin R. Fuller
*Assistant Examiner*—Valerie Ann Lund
*Attorney, Agent, or Firm*—Joseph G. Walsh

[57] ABSTRACT

In a print head for ink jet printing a nozzle plate with a nozzle array is gold plated. The gold plated nozzle array is bonded to the polymer ink barrier layer on an electronic chip by a thin layer of tantalum, zirconium, titanium or silicon dioxide. The thin layer greatly increases the ability of the surface to bond chemically to the polymer.

6 Claims, 1 Drawing Sheet

INK JET PRINTING NOZZLE ARRAY BONDED TO A POLYMER INK BARRIER LAYER

DESCRIPTION OF THE INVENTION

The present invention is concerned with ink jet printing. In particular it is concerned with a nozzle array bonded to a polymer ink barrier layer.

BACKGROUND OF THE INVENTION

In ink jet printing it is sometimes required that the nozzle array be adhered to the polymer which forms the ink chambers on the print head chip. The nozzle array can be gold plated, making it very difficult for the polymer to adhere to it with a durable bond, because the bond tends to degrade in the presence of aqueous ink. This degradation leads to severe reliability problems. In the prior art, the bond has been formed by using heat and pressure, but such a bond is mechanical in nature and it is therefore relatively easy for moisture ingress to occur at the interface and weaken the bond.

U.S. Pat. No. 3,725,719 deals with a method and apparatus for inhibiting gaseous permeation and corrosion of materials by using a coating of gold and tantalum and also an organic coating. The patent is obviously not dealing with ink jet printing.

U.S. Pat. No. 4,608,268 and related U.S. Pat. No. 4,668,336 both deal with a process for making a mask used in x-ray photolithography. It shows layers of tantalum, gold and polyimide. The patents, however, are in no way concerned with ink jet printing.

DISCLOSURE OF THE INVENTION

It has now been found that a gold plated nozzle array can be durably bonded to a polymer ink barrier layer by applying to the gold plated nozzle array a thin layer of tantalum, zirconium, titanium or silicon dioxide. The preferred layer is tantalum. The application of such a thin layer very greatly increases the ability of the surface to bond chemically to the polymer material. Gold nozzle plates treated in this manner and bonded to the polymer ink barrier layer show little degradation of bond strength after soaking in aqueous ink solution, even at elevated temperature for long periods of time, for example, thirty-five days. Untreated gold shows degradation in as little as one day.

The thin layer may be applied to the gold using any of a variety of well known processes, for example, sputtering, evaporation, chemical plating, electrolytic plating and chemical vapor deposition. The preferred method of application is dependent on the material to be deposited. An advantage of a vacuum deposition process such as sputtering or evaporation is that the coating is applied to only the surface of the nozzle array that will be bonded. This preserves the surface wetting characteristics of the opposing side.

The layer of, for example, tantalum should be from about 5 to about 1,000 Angstroms thick. Application of such a layer can easily be achieved by sputtering. Before application of the layer, the gold surface should be thoroughly cleaned of all contaminants using techniques such as oxygen plasma ashing, chemical etch or a sputter etch. Such cleaning helps ensure a strong bond between the gold and the applied material.

The present invention can be used with any of the many polymers which are known to be useful to form the polymer ink barrier layer. The polymer should be photo-imageable, at least during the processing step in which it is patterned on the chip. A photosensitizer, many of which are known to the prior art, can be added to the polymer when needed or desired. One preferred polymer composition is that of acrylate containing epoxy.

DESCRIPTION OF THE DRAWING

Understanding of the invention will be helped by reference to the accompanying drawing.

Figure 1:
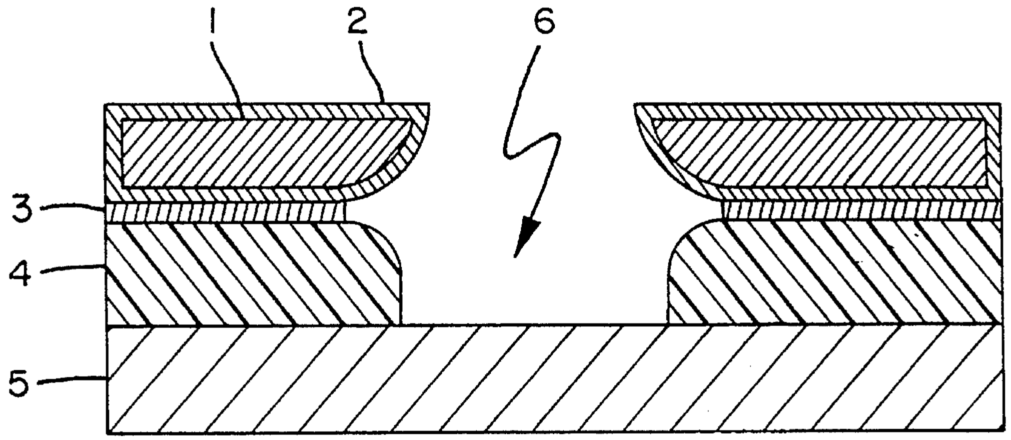
FIG. 1 is a cross section, not to scale, of an ink jet print head.

1 is the nozzle plate, which may be of, for example, nickel, and is about 48 microns thick.

2 is the gold plating which covers the nozzle plate. It is about 1.6 microns thick.

3 is the layer of tantalum bonded to the gold-plated nozzle plate. It is about 1000 Angstroms thick.

4 is the polymer ink barrier layer. It is about 30 microns thick.

5 is the heater chip substrate.

6 is the ink chamber which is formed by the chip and the polymer ink barrier layer.

The drawing does not show additional layers on top of the chip and generally below the polymer ink barrier layer for defining conductive paths and resistors in the bottoms of the ink chambers.

BEST MODE OF PRACTICING THE INVENTION

In the preferred implementation, the gold plated nozzle plate is sputter etched to clean the surface and thus improve adhesion. The tantalum layer is then sputter deposited to a thickness of 200 Angstroms over the gold surface.

The bonding of the nozzle plate to the heater chip is carried out after the acrylate/epoxy thick film material (LeaRonal PR100) has been laminated to the wafer, UV exposed through a photomask, and developed. A nozzle plate is aligned with a chip on the wafer, and then held in place with UV curable adhesive while the other nozzle plates are placed on the wafer. Then the wafer is heated to 160° C. for 2 minutes at 175 psi to complete the bond. A post bake of 150° C. for 30 minutes completes the cure of the thick film material.

The foregoing example is given solely for purposes of illustration and should not be interpreted as a limitation on the invention, many variations of which are possible without departing from the spirit or scope thereof.

What is claimed is:

1. A print head for ink jet printing comprising a gold plated nozzle array and a polymer ink barrier layer on an electronic chip, said head being characterized by having said gold plated nozzle array bonded to said polymer ink barrier layer by a thin layer of tantalum, zirconium, titanium or silicon dioxide.

2. A print head as claimed in claim 1 wherein the thin layer is tantalum.

3. A print head as claimed in claim 1 wherein the thin layer is from 5 to 1,000 Angstroms thick.

4. A print head as claimed in claim 2 wherein the tantalum has been sputtered onto the gold plated nozzle array.

5. A print head as claimed in claim 1 wherein the polymer is a photo-imageable acrylate containing epoxy.

6. A print head for ink jet printing comprising a gold plated nozzle array bonded by a layer of tantalum about 200 Angstroms thick to a polymer ink barrier layer which is on an electronic chip.

* * * * *